United States Patent
Pechtold

(10) Patent No.: US 7,442,457 B2
(45) Date of Patent: Oct. 28, 2008

(54) FUEL CELL SYSTEM WITH COMPRESSOR AND ALSO A METHOD FOR OPERATING SUCH A FUEL CELL SYSTEM

(75) Inventor: Rainer Pechtold, Russelsheim (DE)

(73) Assignee: General Motors Corporation, Detroit, MI (US)

( * ) Notice: Subject to any disclaimer, the term of this patent is extended or adjusted under 35 U.S.C. 154(b) by 321 days.

(21) Appl. No.: 10/378,482

(22) Filed: Mar. 3, 2003

(65) Prior Publication Data

US 2003/0170517 A1    Sep. 11, 2003

(30) Foreign Application Priority Data

Mar. 8, 2002    (DE) ................ 102 10 358

(51) Int. Cl.
*H01M 8/04*    (2006.01)
(52) U.S. Cl. ............... 429/25; 429/23; 429/24; 429/22; 429/20; 429/13; 123/402; 123/432; 60/734; 60/735; 60/574
(58) Field of Classification Search ............. 429/12–46
See application file for complete search history.

(56) References Cited

U.S. PATENT DOCUMENTS

| | | | | |
|---|---|---|---|---|
| 4,724,817 A * | 2/1988 | Cook | .................. | 123/565 |
| 5,081,836 A * | 1/1992 | Smith et al. | .................. | 60/280 |
| 5,771,867 A * | 6/1998 | Amstutz et al. | .......... | 123/568.21 |
| 6,190,791 B1 | 2/2001 | Hornburg | .................. | 429/17 |
| 6,314,951 B1 | 11/2001 | Wenger et al. | ........... | 123/559.2 |
| 6,349,535 B1 * | 2/2002 | Berg et al. | ................ | 60/39.12 |

(Continued)

FOREIGN PATENT DOCUMENTS

DE    2056807    5/1972

(Continued)

OTHER PUBLICATIONS http://hyperphysics.phy-astr.gsu.edu/hbasepber.html, (p. 1).*

(Continued)

*Primary Examiner*—Patrick Ryan
*Assistant Examiner*—Cynthia Lee

(57) ABSTRACT

A fuel cell system comprising a plurality of fuel cells combined together to form a fuel cell stack, with the fuel cell stack having an anode side with an inlet for a fuel and an outlet for non-consumed fuel and exhaust gases arising at the anode side as well as a cathode side with an inlet for a gaseous oxidising agent such as air and an outlet for exhaust gases which arise at the cathode side, and a compressor having a compressor inlet and a compressor outlet, the compressor outlet of which is connected to the oxidising agent inlet of the fuel cell stack provided at the cathode side, is characterised in that a gas dynamic pressure wave machine having a driven rotor is provided, with an inlet for exhaust gases arising at the cathode side, an inlet for fresh oxidizing agent, an outlet for oxidising agent compressed by the cathode side exhaust gases and also an outlet for the cathode side exhaust gases being associated with the rotor and with the outlet for the oxidising agent compressed by the cathode side exhaust gases being connected upstream of the input of the compressor.

27 Claims, 4 Drawing Sheets

U.S. PATENT DOCUMENTS 6,439,209 B1 * 8/2002 Wenger et al. ........... 123/559.2
2002/0004157 A1 1/2002 Keefer et al.

FOREIGN PATENT DOCUMENTS

| DE | 3503071 | 1/1986 |
| DE | 19755116 | 3/1999 |
| DE | 19856499 | * 10/2000 |
| EP | 0270101 | 12/1987 |
| JP | 2002056865 | * 2/2002 |

OTHER PUBLICATIONS

Machine translation of JP 2002-056865, Feb. 22, 2002.*

* cited by examiner

FUEL CELL SYSTEM WITH COMPRESSOR AND ALSO A METHOD FOR OPERATING SUCH A FUEL CELL SYSTEM

TECHNICAL FIELD

The present invention relates to a fuel cell system and method of operating the same.

SUMMARY OF THE INVENTION

In order to satisfy this object a fuel cell system is provided comprising a plurality of fuel cells combined together to form a fuel cell stack, each said fuel cell having an anode, a cathode and a membrane arranged there-between and said fuel cell stack having an anode side with an inlet for a fuel and an outlet for non-consumed fuel and exhaust gases arising at said anode side as well as a cathode side with an inlet for a gaseous oxidising agent such as air and an outlet for exhaust gases which arise at said cathode side, a compressor having a compressor inlet and a compressor outlet connected to said inlet for a gaseous oxidising agent provided at said cathode side, a gas dynamic pressure wave machine having a driven rotor and, associated with said driven rotor, an inlet for exhaust gases arising at said cathode side of said fuel cell stack, an inlet for fresh oxidizing agent, an outlet for oxidising agent compressed in said gas dynamic pressure wave machine by said exhaust gases arising at said cathode side and also an outlet for said exhaust gases arising at said cathode side, said outlet for said oxidising agent compressed in said gas dynamic pressure wave machine being connected to said compressor inlet.

In other words, the existing compressor is supplemented by a gas dynamic pressure wave machine which admittedly represents an additional component but which makes it possible to reduce the size of the compressor and to significantly reduce the drive power required for it.

Also in accordance with the present invention there is provided a method for the operation of a fuel cell system comprising a plurality of fuel cells combined together to form a fuel cell stack, each said fuel cell having an anode, a cathode and a membrane arranged there-between and said fuel cell stack having an anode side with an inlet for a fuel and an outlet for non-consumed fuel and exhaust gases arising at said anode side as well as a cathode side with an inlet for a gaseous oxidising agent such as air and an outlet for exhaust gases which arise at said cathode side, a compressor having a compressor inlet and a compressor outlet connected to said inlet for a gaseous oxidising agent provided at said cathode side and a gas dynamic pressure wave machine having a driven rotor with a plurality of chambers, supplying said exhaust gases which arise at said cathode side to an inlet of said gas dynamic pressure wave machine, introducing fresh oxidizing agent into said chambers of said rotor, compressing said fresh oxidizing agent introduced into said chambers of said rotor by pressure waves originating from said exhaust gases which arise at said cathode side, leading said compressed fresh oxidising agent to said compressor inlet and expelling exhaust gases which arise at said cathode side and are contained in said rotor out of the gas dynamic pressure wave machine by pressure waves propagating in said chambers of said rotor.

The present invention is thus based on the consideration that the cathode side exhaust gases at the outlet of the fuel cell stack have a pressure which is not much lower than the delivery pressure of the compressor and for examples lies about 0.3 bar below this delivery pressure. The possibility thus exists of exploiting this pressure in order to drive a compressor which relieves the electrically driven compressor. In this way the energy of the cathode side exhaust gases is intentionally used and otherwise lost energy is exploited in order to reduce the drive power required for the compressor. It is admittedly already known, for example from DE-OS 101 30 095.6 to drive an expander by the cathode side exhaust gases with the expander being coupled to the compressor by a shaft. Here the energy of the cathode side exhaust gases is admittedly also exploited in order to reduce the drive power required for the compressor, a reduction of the size of the compressor is however not possible in this way and the need to couple the expander with the compressor via a shaft represents an additional complication. Moreover, an expander of this kind does not necessarily work very efficiently with the prevailing exhaust gas conditions.

In the solution of the invention in contrast, the gas dynamic pressure wave machine operates in series with the compressor, whereby the size of the compressor can be reduced. Moreover the pressure wave machine can be operated relatively efficiently with the exhaust gas conditions that prevail, so that the power savings are significantly larger when driving the compressor then is the case when an expander is used. Since no shaft type coupling of the gas dynamic pressure wave machine with the compressor is required, no additional complexity arises with the invention for a connection shaft between the pressure wave machine and the compressor since a shaft of this kind does not have to be provided. It is admittedly conceivable, under some circumstances, to provide such a shaft in order to drive the rotor of the pressure wave machine from the shaft of the compressor or from the motor driving the compressor, this shaft is however only loaded with a small torque, because the power recovered in the pressure wave machine is not transported via the shaft of the compressor but rather via the compressed fresh air which is blown by the pressure wave machine into the compressor. When using an expander, a torque is transmitted from the expander to the rotor of the compressor. In contrast, when using a gas dynamic pressure wave machine and driving the rotor of this machine from the compressor or from the drive motor of the compressor, the transmission of a torque takes place in the other direction. This torque is relatively small; it must simply be sufficient in order to move the rotor of the pressure wave machine at the desired speed of rotation.

Thus, on starting up the fuel cell system the pressure wave machine only loads the compressor to a small degree when a shaft leads from the compressor to the rotor of the pressure wave machine.

It is particularly favourable that the pressure wave machine can be so designed, with a sophisticated layout, that a part of the cathode side exhaust gases can be mixed with the fresh compressed air whereby sufficiently humidified gases can also be supplied to the inlet of the fuel cell stack and the humidification of the air could indeed also be exploited for appropriate moisture lubrication of the compressor. A lubrication of this kind could possibly be considered if oil lubrication is undesired, for example if contamination of the fuel cells of the exhaust gases of the fuel cell systems is feared.

Gas dynamic pressure wave machines are admittedly known per se, for example DE-OS 20 56 807, DE-OS 35 03 071 or U.S. Pat. No. 6,314,951 granted Nov. 13, 2001 to Wenger et al. Two types of motor vehicle have also been constructed which were equipped with such pressure wave machines. The pressure wave machine has however not been able to establish itself hitherto in vehicle construction using conventional combustion engines and indeed partly as a result of the difficulties which arise in matching the pressure wave machine to the pressure, temperature and speed values of the exhaust gases of the combustion engine which fluctuate depending on the speed of rotation and the power yield.

The realization that such pressure, temperature and speed fluctuations are not present, or are only present to restricted degree in a fuel cell system, so that the matching of the pressure wave machine to the operation of a fuel cell system equipped with it should be simpler than for a combustion engine, belongs to the present invention. Whereas, with a combustion engine which is equipped with the pressure wave machine, one endeavours to prevent a mixing of the exhaust gases of the combustion engine with the fresh air which is supplied by the pressure wave machine to the combustion engine, a mixing of this kind is specifically aimed at in accordance with the invention in order to ensure humidification of the air supplied to the fuel cell stack.

A pressure retaining valve is preferably connected to the outlet of the gas dynamic pressure wave machine provided for the cathode side exhaust gases.

The pressure retaining valve has the task of keeping the pressure level in the fuel cell stack at the desired level, insofar as the pressure drop cross the pressure wave charger is itself not sufficient, which would however be the ideal case and which could possibly make a pressure retaining valve unnecessary. The required pressure depends on various operating parameters, principally on the temperature of the fuel cell stack. The pressure retaining valve thus offers the possibility of designing the operation of the gas dynamic pressure wave machine independently of operating parameters. A control is preferably provided which is connected to the pressure retaining valve and is designed to determine the pressure level of the operating pressure determined at the cathode side of the fuel cell stack by the pressure retaining valve, i.e. to determine the setting of the restrictor member of the pressure retaining valve in dependence on operating parameters and hereby to influence the action of the gas dynamic pressure wave machine.

It is favourable when a cooler is arranged between the outlet of the compressor and the cathode side inlet of the fuel cell stack since one can in this way reduce the temperature of the air flowing into the fuel cell stack and counteract the unavoidable temperature increase in the pressure wave machine and in the compressor.

It is particularly favourable when using a gas dynamic pressure wave machine that it can be designed to mix some of the very moist cathode-side exhaust gases with the fresh oxidizing agent and hereby to humidify it.

Various possibilities exist for achieving a desired mixing of this kind—in contrast to the situation with a customary combustion engine. For example the size and particularly the length of the rotor, or of the chambers provided there and/or of the speed of rotation of the rotor can be selected in order to ensure that a mixing of this kind takes place, i.e. in order to determine the desired degree of mixing of the cathode side exhaust gases with the fresh air.

The relative position around the axis of the rotor and also the circumferential extent of the inlet for exhaust gases arising at the cathode side, of the outlet for air compressed by the cathode side exhaust gases and also of the outlet for the cathode side exhaust gases also have an influence on the mixing of the moist cathode side exhaust gases with the fresh air. The length and size of the chamber of the rotor are normally fixed. The possibility however exists of varying both the speed of rotation of the rotor and also the relative position of the inlets and outlets around the axis of the rotor, or the circumferential extent of these inlets and outlets in operation if required, in order to determine, on the one hand, the operation of the pressure wave machine in relation to the respectively desired power yield of the fuel cell stack and, on the other hand, to determine the degree of mixing of the moist cathode side exhaust gases with the fresh air.

It is particularly simple in this connection to change the speed of rotation of the rotor, in particular because—as mentioned above—the drive for the rotor only has to deliver a small torque in order to overcome the friction which is present, but does have to provide any compression work, since this takes place by gas dynamic routes.

One can thus operate with a separate, relatively small, variable speed electric motor as a drive for the rotor. This motor can be connected to the control so that the control also takes care of the regulation of the speed of rotation of the rotor in dependence on the power yield and in dependence on the respective operating conditions. The possibility also exists of driving the rotor of the pressure wave machine via a shaft using the electric motor which drives the compressor i.e. to couple it to the compressor rotor. In this way the rotor of the pressure wave machine would run in synchrony with the rotor of the compressor.

Should more flexibility be desired here then a transmission with a controllable transmission ratio could be used between the rotor of the pressure wave machine and the rotor of the compressor, or the electric motor driving the compressor. It would then be favourable to also connect the controllable transmission to the control in order to realize a control of the speed of rotation of the rotor as a function of the power yield of the fuel cell system, or also to take account of changing requirements with respect to humidification of the entering fresh air. In principle the possibility also exists of dispensing with a motor for the driving of the rotor of the pressure wave machine completely. This could for example be achieved if the chambers of the rotor have an inclined position to a longitudinal axis of the rotor extending parallel to the longitudinal axis of the rotor, or are made curved or angled, so that the action of the gas flows which enter into the rotor and emerge from the rotor determine the speed of rotation of the rotor, so that a motor or a coupling with the compressor could be dispensed with.

It is particularly favourable in a pressure wave machine of the described kind that the chambers of the rotor do not require any special cooling since, in contrast to a combustion engine the temperature of the cathode side exhaust gases of the fuel cell stack are in any event relatively low and the rotor is also cooled, during each rotation by the fresh air. Thus one can operate with a relatively simple rotor design, whereby the design of the pressure wave machine as a whole is simplified. Since the compressor now only has to take care of a smaller pressure increase it could, dependent on the type of construction, be made smaller than would otherwise be necessary if no pressure wave machine is used. In any event a substantially smaller drive power is required for the compressor in accordance with the invention and the total cost and complexity for the pressure wave machine and the compressor can be hereby reduced.

Particularly favourable embodiments of the invention can be seen from the patent claims and also from the subsequent description.

The invention will subsequently be explained in more detail by way of example only and with reference to embodiments and to the accompanying drawings.

DESCRIPTION OF THE PREFERRED EMBODIMENT

Figure 1:
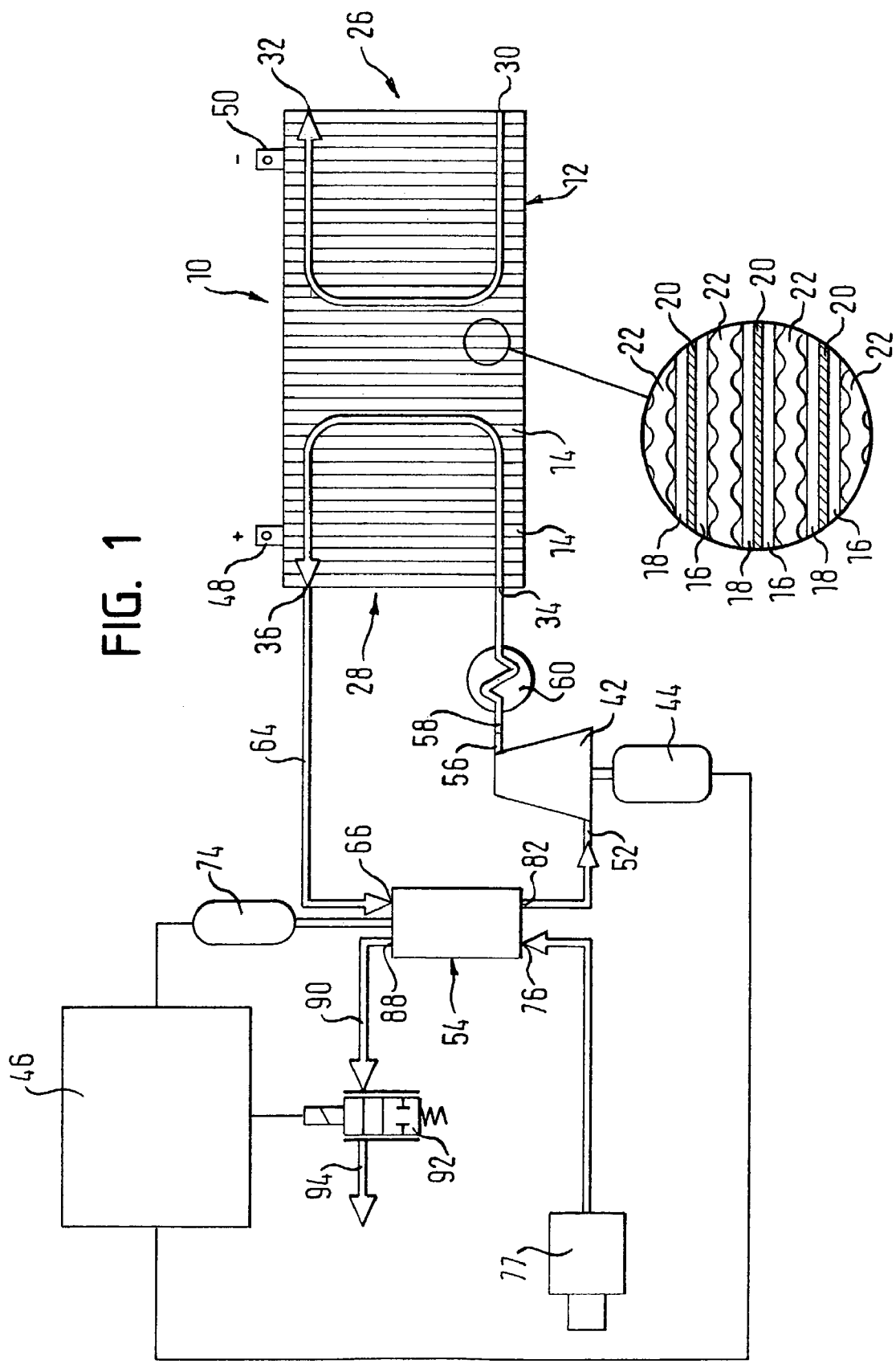
FIG. 1 shows a schematic representation of a fuel cell system in accordance with the invention.

FIG. 1 shows a fuel cell system 10 having a plurality of fuel cells 14 combined into a fuel cell stack 12 which, in accordance with the detail I each have an anode 16, a cathode 18 and a membrane 20 arranged therebetween.

For each fuel cell 14 the arrangement of the anode 16, the cathode 18 and the membrane 20, which forms the so-called MEA (Membrane Electrode Assembly), is disposed between two so-called bipolar plates 22, and—apart from the end plates of the stack—each bipolar plate is disposed between two adjacent membrane electrode assemblies. At one side each such bipolar plate forms, together with the anode 16 of the one fuel cell a flow field for a fuel and, on the other side, together with the cathode 16 of the adjacent fuel cell, a flow field for a gaseous oxidizing agent. The flow fields are frequently formed by fine passages which are worked into the bipolar plate. The bipolar plates are in each case frequently assembled from two plates lying aerially against one another, with cooling passages for a gaseous or liquid coolant being provided between the two plates. The design of fuel cells is well known per se and will not be described here further, since the specific design of the fuel cells is not important for the present invention.

It suffices to say that the fuel cells in the fuel cell stack are so arranged that the anodes are connected together and thus form an anode side 26 of the fuel cell stack, whereas the cathodes of the individual fuel cells are likewise connected together and form a cathode side of the fuel cell stack.

The anode side 26 of the fuel cell stack has an inlet 32 for a fuel and an outlet 32 for non-consumed fuel and also exhaust gases which arise at the anode side. In similar manner the cathode side 28 of the fuel cell stack 12 has an inlet 34 for a gaseous oxidizing agent such as air and an outlet 36 for exhaust gases which arise at the cathode side.

The reference number 42 points to a compressor driven by an electric motor 44, with the electric motor 44 receiving its drive power from the terminals 48, 50 of the fuel cell stack via a control 46 and with the motor optionally being driven when starting up the fuel cell system from a battery, as is explained in more detail in the German patent application 101 30 095.6

The inlet 52 of the compressor receive pre-compressed air from a gas dynamic pressure wave machine 54, i.e., from a gas dynamic pressure wave charger and delivers compressed air at its outlet 56 at about 3 bar absolute to the cathode side inlet 34 of the fuel cell stack 12 via a duct 58 and a heat exchanger 60 designed as a cooler.

The oxygen contained in the compressed air reacts at the cathode side 28 of the fuel cell system within the individual fuel cells 14 with protons delivered from the anode side 26 of the fuel cell stack 12 for the formation of water and the simultaneous generation of electrical power, which can for example be tapped of at the terminals 48, 50. The cathode-side exhaust gases, which principally consist of nitrogen as a component of the air which is delivered with the air by the compressor 42 and which does not react in the fuel cell, of water in vapour form and droplet form and also of non-consumed oxygen leave the fuel cell stack at the outlet 36. The cathode-side exhaust gases which leave the fuel cell stack 12 for example at a pressure of approximately 2.7 bar absolute flow through the duct 64 and enter into the gas dynamic pressure wave machine 54 at the inlet 66. In the gas dynamic pressure wave machine 54 a process then takes place which is described in detail in connection with a customary combustion engine in the PCT application PCT/EP98/05376, which was published as WO 99/11913.

Figure 2:
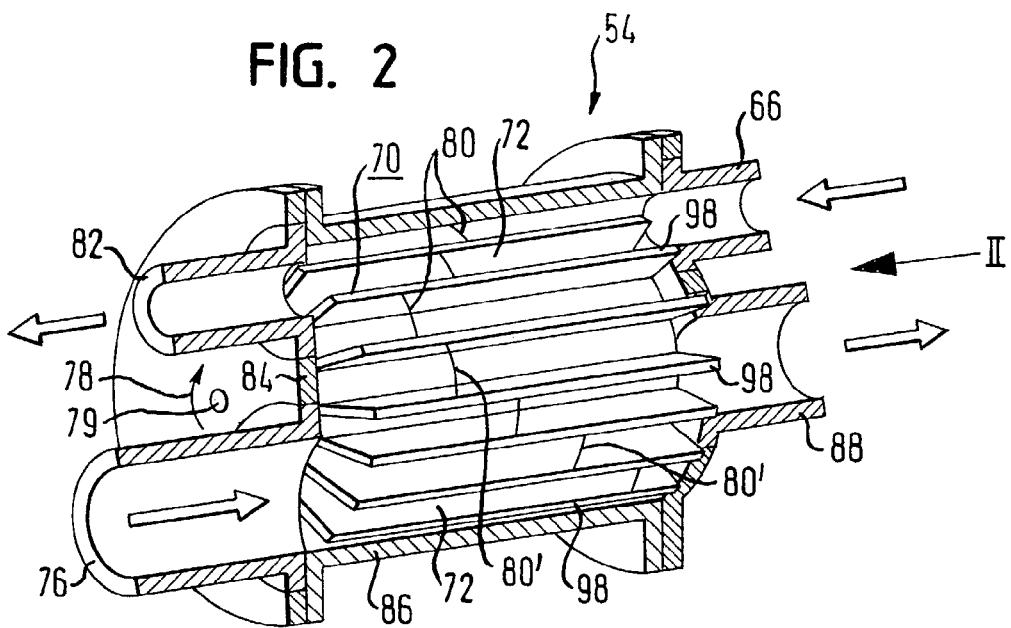
FIG. 2 shows a partly broken away representation of a gas dynamic pressure wave machine which is designed for use in the fuel cell system of FIG. 1.

As can be seen from FIG. 2, the rotor 70 of the gas dynamic pressure wave machine 54 is basically provided with a plurality of elongate chambers 72 distributed over its periphery which extend in the axial direction of the rotor. The rotor 70 itself is driven in the example of FIG. 1 from a separate electric motor 74 and indeed at a speed which is predetermined by the control 46. In the lower left hand region of the rotor 70 an inlet 76 for fresh air is flanged of the rotor housing 76. This fresh air flows into the chamber 72 of the rotor moving past it and is transported upwardly in accordance from the direction of the rotation 78 of the rotor in FIG. 2 until the chambers reach a position where the inlet 66 for the cathode-side exhaust gases is located.

Since the pressure in the respective rotor chambers 72 lies approximately at atmospheric pressure directly before the inlet 66 for the cathode-side exhaust gases whereas the pressure at the inlet 66 is higher a pressure wave runs, as a result of the pressure difference, into the rotor chamber as it moves past, with the lines 80 indicating the propagation of the pressure wave along the rotor chambers 72. Through this pressure wave the fresh air which was previously present at approximately atmospheric pressure and temperature is compressed and expelled from the outlet 82 for fresh air at higher pressure and supplied to the inlet 52 of the compressor 42. If the respective rotor chambers 72 runs past the outlet for compressed rest air, then they come into a region 84 of the housing 86 where the housing closes off the rotor chamber and this leads to the direction of the pressure wave 80 changing. As shown by the further lines 80' the pressure wave 80' then leaves in the direction of the outlet 88 provided for the cathode-side exhaust gases, where the exhaust gases leave the fuel cell system via the duct 90, the pressure retaining valve 92 and the further duct 94. The pressure retaining valve 92 is also connected to the control 46 and is controlled in dependence on operating parameters of the fuel cell stack in order to keep the pressure at the anode side 28 of the fuel cell stack 12 in the permissible range.

The rotation of the rotor corresponding to the arrow 78 requires only a moderate torque, because the rotor itself does not deliver any compression work, this compression work takes place exclusively through the gas dynamic process which takes places in the elongate chamber 72 of the rotor 70.

Figure 2A:
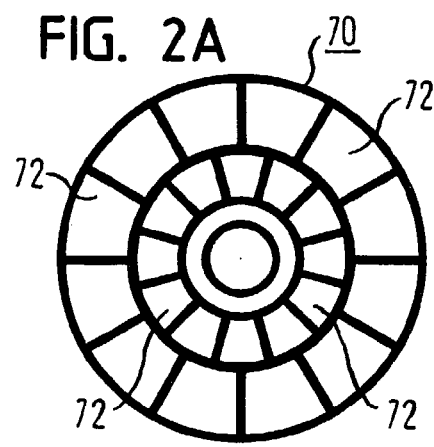
FIG. 2A shows a view in the direction of the arrow II of FIG. 2 of a practical embodiment of the rotor used there.
Figure 3:
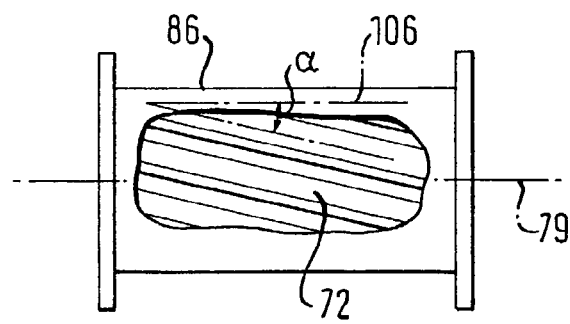
FIG. 3 shows a side-view of a gas dynamic pressure wave machine with the housing partly broken away in order to show a special design of the rotor.

In the representation of FIG. 2 the elongate chambers 72 of the rotor 70 are shown as if they were only restricted on three sides by material of the rotor and as if the fourth side of the chambers 72 were formed by the cylindrical side-wall of the housing 86 of the pressure wave machine 54. Although a design of this kind might eventually be possible the representation of FIG. 2 (and also of FIGS. 3 and 4) is only selected in order to be able to better explain the gas dynamic processes with respect to the pressure waves 80, 80'. In practice, the chambers 72 are closed on all four sides and are only open at their ends, as is evident from FIG. 2A. There the chambers 72 are also arranged in two concentric groups which is likewise preferred.

It should be pointed out that the gas flow in the rotor 70 admittedly follows the movement of the pressure wave, as symbolized by the reference numerals 80, 80' but with a significantly lower speed. Nevertheless one succeeds with such a gas dynamic pressure wave machine 54 in achieving a high efficiency, although the pressure of the entering cathode side exhaust gases is at a relatively low pressure level.

Although the pressure waves 80, 80' shown in FIG. 2 suggest a clear separation between the cathode side exhaust gases and the compressed fresh air, in practice a certain mixing takes place between the cathode side exhaust gases and the fresh air. This is indeed desirable in a fuel cell arrangement since one can in this way take care of a certain humidification of the fresh air.

In accordance with the invention it is indeed desired to enhance this mixing and the degree of mixing can be influenced by an intentional choice of the length of the rotor and/or of the speed of rotation of the rotor and a relative position of the inlet 66 for cathode-side exhaust gases, of the outlet 82 for compressed fresh air 82 and of the outlet 88 for cathode-side exhaust gases around the circumference of the rotor 70, with not only the relative position as such, but rather also the angular extent and/or the length of the respective inlets 66, 76 and outlets 82, 88 in the circumferential direction of the rotor 70 having a role to play.

Although, in the embodiment of FIGS. 1 and 2, the rotor is driven by a separate motor this is not necessarily required. For example the chambers 72 of the rotor 70 could be arranged in accordance with FIG. 3 so that they form an acute angle α with a generatrix 106 of the housing which lies parallel to the axis of rotation 79 of the rotor. In this manner the ingoing and outgoing exhaust gases exert a torque on the rotor 70 which itself takes care of the rotation of the rotor. It is only necessary to select the relative position of the inlets 66, 76 and outlets 82, 88 taking account of the acute angle α.

Figure 4:
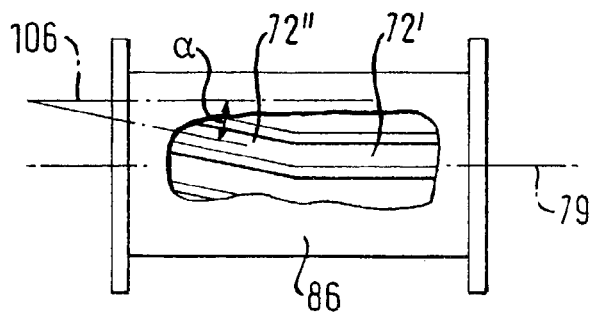
FIG. 4 shows a representation similar to FIG. 3 but with a modified form of the rotor.

It is also not essential for the rotor chambers 72 to extend in a straight line or in helix form around the circumference of the rotor. Instead of this a curved or angular arrangement is possible, as shown in FIG. 4. Here the chamber section 72' extends parallel to the generatrix 106 whereas the section 72" forms an acute angle α to the generatrix 106.

Figure 5:
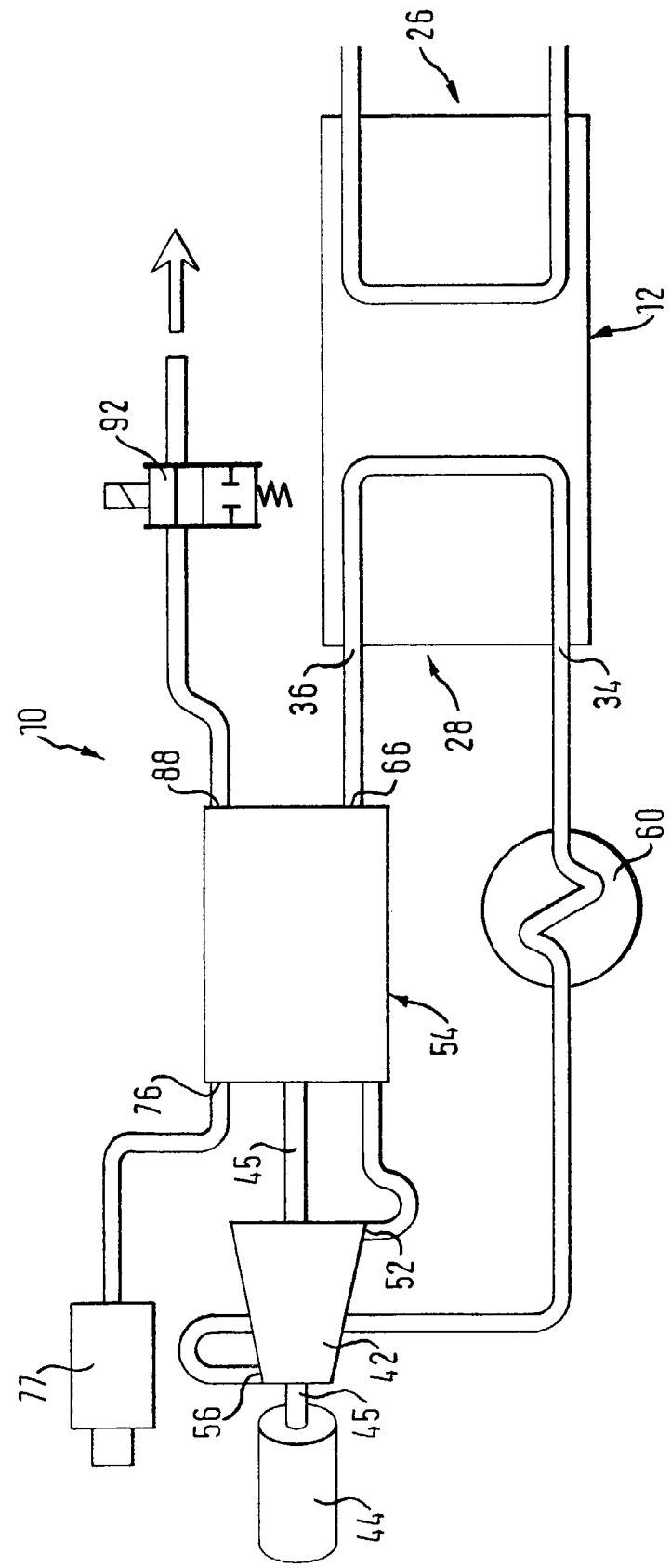
FIG. 5 shows a representation similar to FIG. 1 but of a further design of a fuel cell system in accordance with the invention.

It is also not necessary to provide a separate motor 74 for the driving of the rotor of the pressure wave machine 54, but rather the electric motor 44 which serves for driving the compressor can, as shown in FIG. 5, also be used to drive the rotor of the pressure wave machine.

In the drawing of FIG. 5 parts which have already been described in connection with FIG. 1 are characterized by the same reference numerals so that the previous description of FIG. 1 also applies for correspondingly numbered parts in FIG. 5, which is why these parts will not be especially described in connection with FIG. 5. This also applies to the drawing of FIG. 6.

In the example of FIG. 5, in contrast to FIG. 1, the electric motor 44 drives the compressor 42, from the high pressure end rather than from the low pressure end, and the drive shaft 45 extends through the compressor 42 where it drives the rotor provided there and passes subsequently on to the (not illustrated) rotor of the gas dynamic pressure wave machine 54 to which it is likewise connected. The pre-compressed air from the gas dynamic pressure wave machine 54, which is for example compressed to a value of about 2 bar absolute then flows into the compressor 42 at 52 where the pressure is further increased to 3 bar absolute. As a result of the pre-compression in the pressure wave machine 54 the size of the compressor 42 could be substantially be reduced, whereby the power required for the driving of the compressor is also reduced. After cooling down of the compressed air delivered by the compressor 42 in the heat exchanger 60 the air then flows at the inlet 34 into the cathode side 28 of the fuel cell stack 12.

The cathode exhaust gases which leave the cathode side of the fuel cell stack 12 and, for example, have a pressure in the region of approximately 2.7 bar absolute, lose part of their pressure in the pressure wave machine and then flow through the pressure retaining valve 92 and the line 94 into the environment. The function of the pressure retaining valve 92 is to enable a fine tuning of the operation of the fuel cell system at various operating conditions.

The higher the speed of the rotor the lower is the degree of mixing of the cathode side exhaust gases with the fresh air in the rotor. It can be assumed that the cathode exhaust gases are 100% humidified, i.e. have a relative humidity of 100%, so that even after mixing with the fresh air an adequate relative humidity of the air entering into the cathode side of the fuel cell stack 12 is always present.

Figure 6:
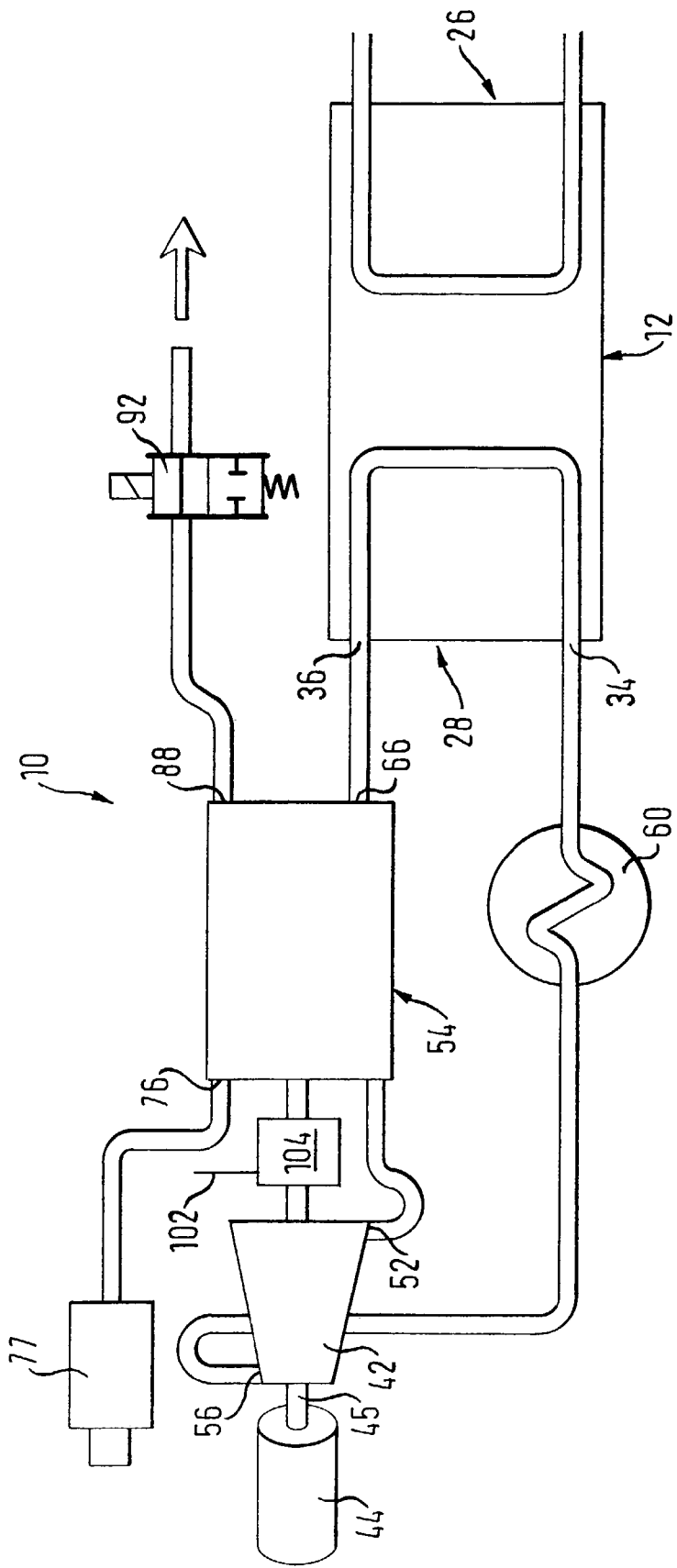
FIG. 6 shows a representation similar to FIG. 5 but have a yet further design of a fuel cell system in accordance with the invention.

In the arrangement of FIG. 6 a transmission 104 controllable by the control 46 (FIG. 1) via a line 102 is provided between the compressor rotor and the rotor of the gas dynamic pressure wave machine, so that the speed of rotation of the rotor can be selected via the control of the transmission 104 independently of the speed of rotation of the rotor of the compressor 42.

The invention claimed is:

1. A method for the operation of a fuel cell system, comprising:

providing a plurality of fuel cells combined together to form a fuel cell stack, each said fuel cell having an anode, a cathode and a membrane arranged therebetween and said fuel cell stack having an anode side with an inlet for a fuel and an outlet for non-consumed fuel and exhaust gases arising at said anode side as well as a cathode side with an inlet for a gaseous oxidizing agent such as air and an outlet for exhaust gases which arise at said cathode side;

providing a compressor having a compressor inlet and a compressor outlet connected to said inlet for a gaseous oxidizing agent provided at said cathode side;

providing a gas dynamic pressure wave machine having a driven rotor with a plurality of chambers;

supplying said exhaust gases which arise at said cathode side to an inlet of said gas dynamic pressure wave machine, wherein at least a portion of the exhaust gases is directed into the chambers of the rotor;

introducing fresh oxidizing agent into said chambers of said rotor, wherein the fresh oxidizing agent is humidified by the exhaust gases in the chambers;

compressing said fresh oxidizing agent and the portion of the exhaust gases introduced into said chambers of said rotor by pressure waves originating from said exhaust gases which arise at said cathode side so that the exhaust gases simultaneously drive the rotor and humidify the oxidizing agent;

leading said compressed fresh oxidizing agent to said compressor inlet;

expelling exhaust gases which arise at said cathode side and are contained in said rotor out of gas dynamic pressure wave machine by pressure waves propagating in said chambers of said rotor and using a control connected to a pressure retaining valve to determine an operating pressure at said cathode side of said fuel cell stack and to thereby adapt a behavior of said gas dynamic pressure wave machine in dependence on operating parameters of said fuel cell system;

controlling a speed of rotation of a motor which drives said rotor of said gas dynamic pressure wave machine in accordance with a power yield of the fuel cell system; and controlling a transmission ratio of a controllable transmission provided between said rotor of said gas dynamic pressure wave machine and said motor driving said compressor in accordance with a power yield of said fuel cell system.

2. A method in accordance with claim 1, further comprising driving said rotor by said motor which simultaneously drives said compressor.

3. A fuel cell system, comprising: a plurality of fuel cells combined together to form a fuel cell stack, each said fuel cell having an anode, a cathode and a membrane arranged therebetween and said fuel cell stack having an anode side with an inlet for a fuel and an outlet for non-consumed fuel and exhaust gases arising at said anode side as well as a cathode side with an inlet for a gaseous oxidizing agent and an outlet for exhaust gases which arise at said cathode side, said fuel cell stack having operating parameters including an operating pressure with a pressure level;

a compressor having a compressor inlet and a compressor outlet connected to said inlet for a gaseous oxidizing agent provided at said cathode side;

a gas dynamic pressure wave machine having a driven rotor and, associated with said driven rotor, an inlet for exhaust gases arising at said cathode side of said fuel cell stack, an inlet for fresh oxidizing agent, an outlet for oxidizing agent compressed in said gas dynamic pressure wave machine by said exhaust gases arising at said cathode side and also an outlet for said exhaust gases arising at said cathode side, said outlet for said oxidizing agent compressed in said gas dynamic pressure wave machine being connected to said compressor inlet, wherein the exhaust gases and the fresh oxidizing agent are at least partially mixed in the pressure wave machine so that the exhaust gases simultaneously humidify the oxidizing agent and drive the pressure wave machine;

a pressure retaining valve connected downstream of said outlet of said gas dynamic pressure wave machine for said exhaust gases arising at said cathode side;

a control connected to said pressure retaining valve and designed to influence said pressure level as determined by said pressure retaining valve in dependence on said operating parameters and to thereby influence operation of said gas dynamic pressure wave machine;

an electric motor adapted to drive said compressor, said electric motor also being adapted to drive said rotor of said gas dynamic pressure wave machine;

a shaft coupling said rotor of said gas dynamic pressure wave machine to at least one of said electric motor and said compressor; and a transmission, said rotor of said gas dynamic pressure wave machine being coupled via said transmission to at least one of said electric motor and said compressor.

4. A fuel cell system in accordance with claim 3, further comprising a cooler arranged between said compressor outlet and said inlet for a gaseous oxidizing agent at said cathode side.

5. A fuel cell system in accordance with claim 3, in which said inlet for fresh oxidizing agent associated with said rotor of said gas-dynamic pressure wave machine is an air inlet.

6. A fuel cell system in accordance with claim 5, further comprising an air filter connected upstream of said air inlet.

7. A fuel cell system in accordance with claim 3, wherein said rotor has a plurality of chambers, a speed of rotation, a size and a length and said chambers having a size and a length, at least one of said size and said length of said rotor and said size and said length of said chambers and said speed of rotation of said rotor being adapted to determine a desired degree of mixing of said exhaust gases arising at said cathode side with said fresh oxidizing agent.

8. A fuel cell system in accordance with claim 3, wherein said transmission is a transmission with a controllable transmission ratio.

9. A fuel cell system, comprising: a plurality of fuel cells combined together to form a fuel cell stack, each said fuel cell having an anode, a cathode and a membrane arranged therebetween and said fuel cell stack having an anode side with an inlet for a fuel and an outlet for non-consumed fuel and exhaust gases arising at said anode side as well as a cathode side with an inlet for a gaseous oxidizing agent and an outlet for exhaust gases which arise at said cathode side, said fuel cell stack having operating parameters including an operating pressure with a pressure level;

a compressor having a compressor inlet and a compressor outlet connected to said inlet for a gaseous oxidizing agent provided at said cathode side;

a gas dynamic pressure wave machine having a driven rotor and, associated with said driven rotor, an inlet for exhaust gases arising at said cathode side of said fuel cell stack, an inlet for fresh oxidizing agent, an outlet for oxidizing agent compressed in said gas dynamic pressure wave machine by said exhaust gases arising at said cathode side and also an outlet for said exhaust gases arising at said cathode side, said outlet for said oxidizing agent compressed in said gas dynamic pressure wave machine being connected to said compressor inlet, wherein the exhaust gases and the fresh oxidizing agent are at least partially mixed in the pressure wave machine so that the exhaust gases simultaneously humidify the oxidizing agent and drive the pressure wave machine;

a pressure retaining valve connected downstream of said outlet of said gas dynamic pressure wave machine for said exhaust gases arising at said cathode side; and a control connected to said pressure retaining valve and designed to influence said pressure level as determined by said pressure retaining valve in dependence on said operating parameters and to thereby influence operation of said gas dynamic pressure wave machine;

wherein said fuel cell system has a power yield and further comprising a transmission, said rotor of said gas dynamic pressure wave machine having a speed of rotation and being coupled via said transmission to at least one of said electric motor and said compressor, said transmission being a controllable transmission with a controllable transmission ratio, said control being connected to the controllable transmission and adapted to realize a control of said speed of rotation of said rotor as a function of said power yield of said fuel cell system.

10. A fuel cell system in accordance with claim 9, further comprising a first electric motor adapted to drive said compressor and a second motor adapted to drive said rotor.

11. A fuel cell system, comprising: a plurality of fuel cells combined together to form a fuel cell stack, each said fuel cell having an anode, a cathode and a membrane arranged therebetween and said fuel cell stack having an anode side with an inlet for a fuel and an outlet for non-consumed fuel and exhaust gases arising at said anode side as well as a cathode side with an inlet for a gaseous oxidizing agent and an outlet for exhaust gases which arise at said cathode side, said fuel cell stack having operating parameters including an operating pressure with a pressure level;

a compressor having a compressor inlet and a compressor outlet connected to said inlet for a gaseous oxidizing agent provided at said cathode side;

a gas dynamic pressure wave machine having a driven rotor and, associated with said driven rotor, an inlet for exhaust gases arising at said cathode side of said fuel cell stack, an inlet for fresh oxidizing agent, an outlet for oxidizing agent compressed in said gas dynamic pressure wave machine by said exhaust gases arising at said cathode side and also an outlet for said exhaust gases arising at said cathode side, said outlet for said oxidizing agent compressed in said gas dynamic pressure wave machine being connected to said compressor inlet, wherein the exhaust gases and the fresh oxidizing agent are at least partially mixed in the pressure wave machine so that the exhaust gases simultaneously humidify the oxidizing agent and drive the pressure wave machine;

a pressure retaining valve connected downstream of said outlet of said gas dynamic pressure wave machine for said exhaust gases arising at said cathode side;

a control connected to said pressure retaining valve and designed to influence said pressure level as determined by said pressure retaining valve in dependence on said operating parameters and to thereby influence operation of said gas dynamic pressure wave machine; and a first electric motor adapted to drive said compressor and a second motor adapted to drive said rotor, said rotor having a speed of rotation and said fuel cell system having a power yield, said control being connected to said second motor to control said speed of rotation of said rotor as a function of said power yield of said fuel cell system.

12. A fuel cell system, comprising: a plurality of fuel cells combined together to form a fuel cell stack, each said fuel cell having an anode, a cathode and a membrane arranged therebetween and said fuel cell stack having an anode side with an inlet for a fuel and an outlet for non-consumed fuel and exhaust gases arising at said anode side as well as a cathode side with an inlet for a gaseous oxidizing agent and an outlet for exhaust gases which arise at said cathode side, said fuel cell stack having operating parameters including an operating pressure with a pressure level;

a compressor having a compressor inlet and a compressor outlet connected to said inlet for a gaseous oxidizing agent provided at said cathode side;

a gas dynamic pressure wave machine having a driven rotor and, associated with said driven rotor, an inlet for exhaust gases arising at said cathode side of said fuel cell stack, an inlet for fresh oxidizing agent, an outlet for oxidizing agent compressed in said gas dynamic pressure wave machine by said exhaust gases arising at said cathode side and also an outlet for said exhaust gases arising at said cathode side, said outlet for said oxidizing agent compressed in said gas dynamic pressure wave machine being connected to said compressor inlet, wherein at least a portion of the exhaust gases from the cathode side of the fuel cell stack is mixed with the fresh oxidizing agent in the pressure wave machine so that the exhaust gases simultaneously humidify the oxidizing agent and drive the pressure wave machine;

a pressure retaining valve connected downstream of said outlet of said gas dynamic pressure wave machine for said exhaust gases arising at said cathode side;

a control connected to said pressure retaining valve and designed to influence said pressure level as determined by said pressure retaining valve in dependence on said operating parameters and to thereby influence operation of said gas dynamic pressure wave machine; and a plurality of operating points and said control being connected to said controllable pressure retaining valve to control said operating pressure at said cathode side of said fuel cell stack in dependence on said operating parameters of said fuel cell system and to hereby adapt operation of said gas dynamic pressure wave machine to a respective operating point of said fuel cell system.

13. A method for the operation of a fuel cell system, comprising:

providing a plurality of fuel cells combined together to form a fuel cell stack, each said fuel cell having an anode, a cathode and a membrane arranged therebetween and said fuel cell stack having an anode side with an inlet for a fuel and an outlet for non-consumed fuel and exhaust gases arising at said anode side as well as a cathode side with an inlet for a gaseous oxidizing agent such as air and an outlet for exhaust gases which arise at said cathode side;

providing a compressor having a compressor inlet and a compressor outlet connected to said inlet for a gaseous oxidizing agent provided at said cathode side; and providing a gas dynamic pressure wave machine having a driven rotor with a plurality of chambers;

supplying said exhaust gases which arise at said cathode side to an inlet of said gas dynamic pressure wave machine, wherein at least a portion of the exhaust gases is directed into the chambers of the rotor;

introducing fresh oxidizing agent into said chambers of said rotor, wherein the fresh oxidizing agent is humidified by the exhaust gases in the chambers;

compressing said fresh oxidizing agent and the portion of the exhaust gases introduced into said chambers of said rotor by pressure waves originating from said exhaust gases which arise at said cathode side so that the exhaust gases simultaneously drive the rotor and humidify the oxidizing agent;

leading said compressed fresh oxidizing agent to said compressor inlet; expelling exhaust gases which arise at said cathode side and are contained in said rotor out of gas dynamic pressure wave machine by pressure waves propagating in said chambers of said rotor and using a control connected to a pressure retaining valve to determine an operating pressure at said cathode side of said fuel cell stack and to thereby adapt a behavior of said gas dynamic pressure wave machine in dependence on operating parameters of said fuel cell system; and driving said rotor by a motor which simultaneously drives said compressor.

14. A method in accordance with claim 13, further comprising controlling a speed of rotation of a motor which drives said rotor of said gas dynamic pressure wave machine in accordance with a power yield of the fuel cell system.

15. A method in accordance with claim 13, further comprising controlling a transmission ratio of a controllable transmission provided between said rotor of said gas dynamic pressure wave machine and said motor driving said compressor in accordance with a power yield of said fuel cell system.

16. A fuel cell system, comprising:

a plurality of fuel cells combined together to form a fuel cell stack, each said fuel cell having an anode, a cathode and a membrane arranged therebetween and said fuel cell stack having an anode side with an inlet for a fuel and an outlet for non-consumed fuel and exhaust gases arising at said anode side as well as a cathode side with an inlet for a gaseous oxidizing agent and an outlet for exhaust gases which arise at said cathode side, said fuel cell stack having operating parameters including an operating pressure with a pressure level;

a compressor having a compressor inlet and a compressor outlet connected to said inlet for a gaseous oxidizing agent provided at said cathode side;

a gas dynamic pressure wave machine having a driven rotor and, associated with said driven rotor, an inlet for exhaust gases arising at said cathode side of said fuel cell stack, an inlet for fresh oxidizing agent, an outlet for oxidizing agent compressed in said gas dynamic pressure wave machine by said exhaust gases arising at said cathode side and also an outlet for said exhaust gases arising at said cathode side, said outlet for said oxidizing agent compressed in said gas dynamic pressure wave machine being connected to said compressor inlet, wherein the exhaust gases and the fresh oxidizing agent are at least partially mixed in the pressure wave machine so that the exhaust gases simultaneously humidify the oxidizing agent and drive the pressure wave machine;

a pressure retaining valve connected downstream of said outlet of said gas dynamic pressure wave machine for said exhaust gases arising at said cathode side; and a control connected to said pressure retaining valve and designed to influence said pressure level as determined by said pressure retaining valve in dependence on said operating parameters and to thereby influence operation of said gas dynamic pressure wave machine, wherein said fuel cell system has a plurality of operating points and said control being connected to said controllable pressure retaining valve to control said operating pressure at said cathode side of said fuel cell stack in dependence on said operating parameters of said fuel cell system and to hereby adapt operation of said gas dynamic pressure wave machine to a respective operating point of said fuel cell system.

17. A fuel cell system in accordance with claim 16, further comprising an electric motor adapted to drive said compressor, said electric motor also being adapted to drive said rotor of said gas dynamic pressure wave machine.

18. A fuel cell system in accordance to claim 17, further comprising a shaft coupling said rotor of said gas dynamic pressure wave machine to at least one of said electric motor and said compressor.

19. A fuel cell system in accordance with claim 16, further comprising a cooler arranged between said compressor outlet and said inlet for a gaseous oxidizing agent at said cathode side.

20. A fuel cell system in accordance with claim 16, wherein said inlet for fresh oxidizing agent associated with said rotor of said gas-dynamic pressure wave machine is an air inlet.

21. A fuel cell system in accordance with claim 20, further comprising an air filter connected upstream of said air inlet.

22. A fuel cell system in accordance with claim 16, wherein said rotor has a plurality of chambers, a speed of rotation, a size and a length and said chambers having a size and a length, at least one of said size and said length of said rotor and said size and said length of said chambers and said speed of rotation of said rotor being adapted to determine a desired degree of mixing of said exhaust gases arising at said cathode side with said fresh oxidizing agent.

23. A fuel cell system in accordance with claim 16, further comprising a transmission, said rotor of said gas dynamic pressure wave machine being coupled via said transmission to at least one of said electric motor and said compressor.

24. A fuel cell system in accordance with claim 23, wherein said transmission is a transmission with a controllable transmission ratio.

25. A fuel cell system in accordance with claim 16, wherein said fuel cell system has a power yield and further comprising a transmission, said rotor of said gas dynamic pressure wave machine having a speed of rotation and being coupled via said transmission to at least one of said electric motor and said compressor, said transmission being a controllable transmission with a controllable transmission ratio, said control being connected to the controllable transmission and adapted to realize a control of said speed of rotation of said rotor as a function of said power yield of said fuel cell system.

26. A fuel cell system in accordance with claim 16, further comprising a first electric motor adapted to drive said compressor and a second motor adapted to drive said rotor.

27. A fuel cell system in accordance with claim 16, further comprising a first electric motor adapted to drive said compressor and a second motor adapted to drive said rotor, said rotor having a speed of rotation and said fuel cell system having a power yield, said control being connected to said second motor to control said speed of rotation of said rotor as a function of said power yield of said fuel cell system.

* * * * *